US012763073B2

(12) United States Patent
Kupryjanow et al.

(10) Patent No.: US 12,763,073 B2
(45) **Date of Patent: *Oct. 13, 2026**

(54) REAL-TIME DYNAMIC NOISE REDUCTION USING CONVOLUTIONAL NETWORKS

(71) Applicant: Intel Corporation, Santa Clara, CA (US)

(72) Inventors: Adam Kupryjanow, Gdansk (PL); Tomasz Noczynski, Gdansk (PL); Lukasz Pindor, Pruszcz Gdanski (PL); Sebastian Rosenkiewicz, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 18/770,496

(22) Filed: Jul. 11, 2024

(65) Prior Publication Data

US 2025/0046304 A1 Feb. 6, 2025

Related U.S. Application Data

(63) Continuation of application No. 17/033,605, filed on Sep. 25, 2020, now Pat. No. 12,062,369.

(51) Int. Cl.
*G10L 15/20* (2006.01)
*G10L 15/16* (2006.01)

(52) U.S. Cl.
CPC .............. *G10L 15/20* (2013.01); *G10L 15/16* (2013.01)

(58) Field of Classification Search
CPC ......... G10L 15/20; G10L 15/16; G10L 25/30; G10L 21/0208

(Continued)

(56) References Cited

U.S. PATENT DOCUMENTS 5,878,389 A * 3/1999 Hermansky ......... G10L 21/0208 704/226
6,098,038 A * 8/2000 Hermansky ......... G10L 21/0208 704/226

(Continued)

FOREIGN PATENT DOCUMENTS

CN 111261145 * 6/2020 ......... G10L 21/0208

OTHER PUBLICATIONS

"Yi Luo, Conv-TasNet: Surpassing Ideal Time-Frequency Magnitude Masking for Speech Separation, Sep. 20, 2018, IEEE/ACM Transactions on Audio, Speech and Language Processing, pp. 1256-1266" (Year: 2018).*

*Primary Examiner* — Thuykhanh Le
(74) *Attorney, Agent, or Firm* — Akona IP PC

(57) ABSTRACT

A system, method and computer readable medium for dynamic noise reduction in a voice call. The system includes an encoder having a short-time Fourier transform module to determine a magnitude spectrum and a phase spectrum of an input audio signal. The input audio signal includes speech and dynamic noise. A separator is coupled to the encoder. The separator comprises a temporal convolution network (TCN) used to develop a separation mask using the magnitude spectrum as input. The TCN is trained using a frequency SNR function used to calculate loss during training. A mixer is coupled to the separator to multiply the separation mask with the magnitude spectrum to separate the speech from the dynamic noise to obtain a denoise magnitude spectrum. The system also includes a decoder coupled to the mixer and the encoder. The decoder includes an inverse short-time Fourier transform module to reconstruct the input audio signal without the dynamic noise using the denoise magnitude spectrum and the phase spectrum.

20 Claims, 8 Drawing Sheets

(58) Field of Classification Search
USPC .......................................................... 704/202
See application file for complete search history.

(56) References Cited

U.S. PATENT DOCUMENTS

| | | | | |
|---|---|---|---|---|
| 6,175,602 | B1 * | 1/2001 | Gustafsson | G10L 21/0208 704/226 |
| 6,487,257 | B1 * | 11/2002 | Gustafsson | G10L 21/0208 375/350 |
| 6,507,623 | B1 * | 1/2003 | Gustafsson | G10L 21/0208 704/226 |
| 7,099,822 | B2 * | 8/2006 | Zangi | G10L 21/0208 704/226 |
| 7,117,145 | B1 * | 10/2006 | Venkatesh | G10L 21/0208 704/200 |
| 10,049,668 | B2 * | 8/2018 | Huang | G10L 15/285 |
| 10,255,907 | B2 * | 4/2019 | Nallasamy | G10L 15/063 |
| 10,366,158 | B2 * | 7/2019 | Bellegarda | G06F 40/274 |
| 10,593,346 | B2 * | 3/2020 | Van Gysel | G10L 15/183 |
| 10,789,041 | B2 * | 9/2020 | Kim | G06F 3/165 |
| 11,587,575 | B2 * | 2/2023 | Chu | H04R 3/00 |
| 2002/0184010 | A1 * | 12/2002 | Eriksson | G10L 21/0364 704/E21.009 |
| 2003/0014248 | A1 * | 1/2003 | Vetter | G10L 21/0208 704/226 |
| 2003/0018471 | A1 * | 1/2003 | Cheng | G10L 21/0208 704/275 |
| 2004/0064307 | A1 * | 4/2004 | Scalart | G10L 21/0208 704/205 |
| 2004/0078199 | A1 * | 4/2004 | Kremer | G10L 21/0208 704/233 |
| 2004/0111258 | A1 * | 6/2004 | Zangi | G10L 21/0208 704/226 |
| 2005/0074129 | A1 * | 4/2005 | Fan | G10L 19/26 381/59 |
| 2007/0255535 | A1 * | 11/2007 | Marro | G10L 21/02 704/226 |
| 2008/0175408 | A1 * | 7/2008 | Mukund | G10L 21/0208 381/94.1 |
| 2009/0163168 | A1 * | 6/2009 | Andersen | G10L 21/0208 455/307 |
| 2010/0098266 | A1 * | 4/2010 | Mukund | G10L 21/0208 381/94.7 |
| 2010/0278352 | A1 * | 11/2010 | Petit | G10L 21/0208 381/71.1 |
| 2010/0280824 | A1 * | 11/2010 | Petit | H04R 3/005 704/214 |
| 2011/0305345 | A1 * | 12/2011 | Bouchard | G10L 21/0208 704/226 |
| 2012/0045069 | A1 * | 2/2012 | Sun | G10L 21/0208 381/66 |
| 2012/0171974 | A1 * | 7/2012 | Cimaz | G10L 21/0208 455/114.2 |
| 2013/0054232 | A1 * | 2/2013 | Unno | G10L 21/0208 704/226 |
| 2013/0054233 | A1 * | 2/2013 | Unno | G10L 21/0208 704/226 |
| 2013/0054234 | A1 * | 2/2013 | Kim | G10L 21/0208 704/226 |
| 2014/0095156 | A1 * | 4/2014 | Wolff | G10L 21/0208 704/226 |
| 2014/0172421 | A1 * | 6/2014 | Liu | H04R 1/1083 381/94.1 |
| 2014/0270226 | A1 * | 9/2014 | Borgstrom | G10L 17/00 381/71.11 |
| 2014/0278398 | A1 * | 9/2014 | Fan | H04R 3/005 704/233 |
| 2014/0301558 | A1 * | 10/2014 | Fan | G10L 21/0208 381/71.2 |
| 2015/0371654 | A1 * | 12/2015 | Johnston | G10L 21/0208 381/66 |
| 2016/0112817 | A1 * | 4/2016 | Fan | H04R 3/005 381/94.7 |
| 2016/0140949 | A1 * | 5/2016 | Fan | G10L 21/0208 381/71.11 |
| 2017/0061984 | A1 * | 3/2017 | Bocko | G10L 21/0264 |
| 2018/0367882 | A1 * | 12/2018 | Watts | H04R 1/1083 |
| 2019/0066713 | A1 * | 2/2019 | Mesgarani | G10L 25/30 |
| 2019/0318726 | A1 * | 10/2019 | Jin | G10L 13/02 |
| 2019/0318755 | A1 * | 10/2019 | Tashev | G10L 21/0232 |
| 2020/0294521 | A1 * | 9/2020 | Chen | G10L 19/008 |
| 2021/0256988 | A1 * | 8/2021 | Gallart | G10L 21/0232 |
| 2021/0350796 | A1 * | 11/2021 | Kim | G06N 3/08 |
| 2022/0223144 | A1 * | 7/2022 | Sun | G06N 3/045 |
| 2023/0067132 | A1 * | 3/2023 | Ochiai | G10L 25/93 |

* cited by examiner

REAL-TIME DYNAMIC NOISE REDUCTION USING CONVOLUTIONAL NETWORKS

This application is a Continuation of U.S. patent application Ser. No. 17/033,605, entitled "Real-Time Dynamic Noise Reduction Using Convolutional Networks," filed Sep. 25, 2020, and issued as U.S. Pat. No. 12,062,369 on Aug. 13, 2024, which is herein incorporated by reference.

TECHNICAL FIELD

Embodiments generally relate to speech processing. More particularly, embodiments relate to real-time dynamic noise reduction in an audio stream using convolutional networks.

BACKGROUND

Conventional noise reduction systems detect noises using an event detector and then remove the noise using a dedicated neural network model trained to remove the particular type of noise that was detected. Such systems are very complex due to the requirement of dedicated noise models for event detection and noise removal. For example, dynamic noises such as, for example, a baby crying or a dog barking, require the system to have one noise model trained to reduce baby cry noise and another noise model trained to reduce dog barking noise. In other words, separate noise models are needed for each type of noise that needs to be removed from the audio stream. The latency and computational cost of such a system is significant since it needs to detect the event first and then start the required noise reduction model to remove the noise.

BRIEF DESCRIPTION OF THE DRAWINGS

The various advantages of the embodiments will become apparent to one skilled in the art by reading the following specification and appended claims, and by referencing the following drawings, in which:

Figure 1:
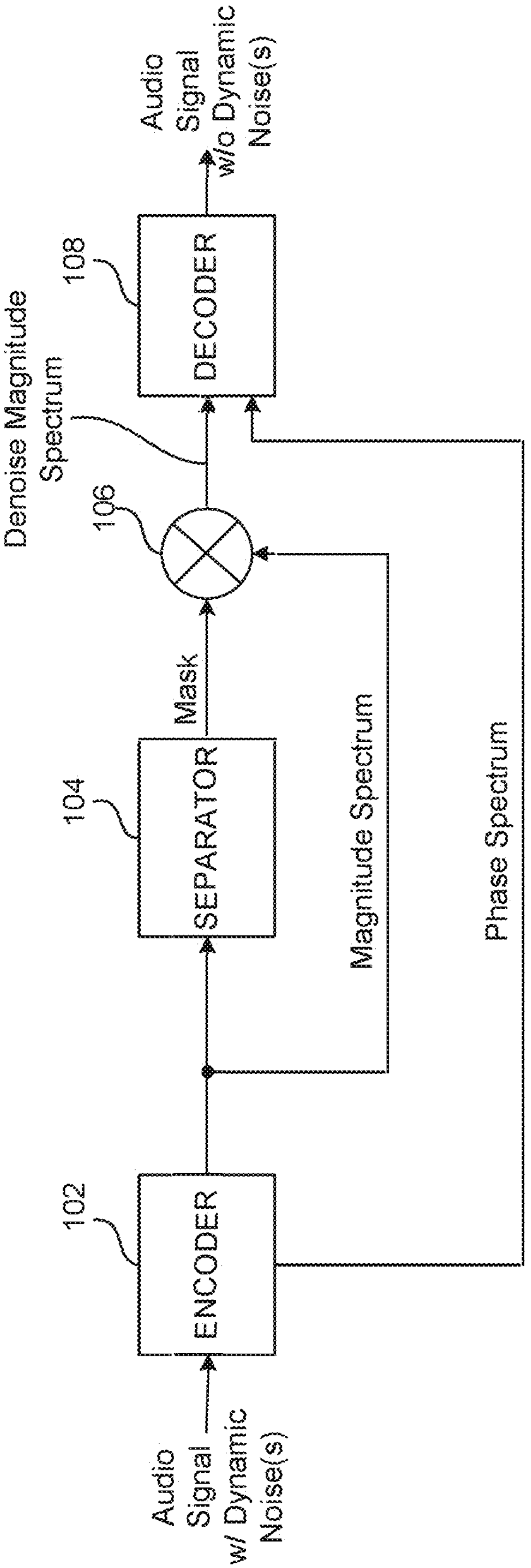
FIG. 1 is an example simplified block diagram of a real-time dynamic noise reduction system according to an embodiment.

In the following detailed description, reference is made to the accompanying drawings which form a part hereof wherein like numerals designate like parts throughout, and in which is shown by way of illustration embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

DESCRIPTION OF EMBODIMENTS

Technology that provides the capability to extract speech and remove/suppress dynamic noises from an audio stream during voice calls. Embodiments use a dynamic noise suppressor (DNS) capable of operating on captured audio (e.g., microphones) and rendered audio (e.g., speakers) paths. The dynamic noises include, for example, a baby crying, a dog barking, a person typing, babbling noises, cafeteria noises, phone, doorbell, horn and siren noises, and other types of dynamic noises that may interfere or annoy listener(s) in a voice call. Embodiments remove dynamic noises without a priori knowledge of noise type. Based on a convolution network, embodiments use a modified version of a Conv-TasNet architecture to perform real-time noise reduction. The architecture includes an encoder, a separator, and a decoder. The encoder/decoder performs a short-time Fourier transform (STFT) and an inverse short-time Fourier transform (iSTFT), respectively. The STFT/iSTFT enable good results in real-life conditions. The separator, used to separate speech from dynamic noises, comprises a hybrid Temporal Convolutional Network (TCN) architecture that incorporates both causal and non-causal network configurations. Embodiments use a logarithmic cost function, i.e., "frequency SNR" function, to calculate loss during training of the network. The cost function provided a tremendous boost to the operation of the TCN separator. Embodiments also perform an inference of the network with a batch of signal frames using a frame grouping technique to achieve real-time performance. The combination of the STFT/ISTFT, the hybrid TCN architecture, the novel cost function and the method used to achieve real-time dynamic noise reduction are some of the factors that enable embodiments of the DNS to achieve high quality, low latency and low compute and memory utilization. Embodiments are also executable on small form factor devices, such as, for example, cell phones, tablets, watches, laptops, wearables having voice call capabilities, etc.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device). As used herein, the term "logic" and "module" may refer to, be part of, or include an application specific integrated circuit (ASIC), an electronic circuit, a processor (shared, dedicated, or group), and/or memory (shared, dedicated, or group) that execute one or more software or firmware programs having machine instructions (generated from an assembler and/or a compiler), a combinational logic circuit, and/or other suitable components that provide the described functionality.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

FIG. 1 is an example simplified block diagram of a real-time dynamic noise reduction system 100 according to an embodiment. System 100 comprises an encoder 102, a separator 104, a multiplier 106 and a decoder 108. Encoder 102 is coupled to separator 104, multiplier 106, and decoder 108. Separator 104 is coupled to encoder 102 and multiplier 106. Decoder 108 is coupled to multiplier 106 and encoder 102.

The encoder 102 is used to determine the sinusoidal frequency and phase content of an input audio signal with dynamic noise. This is accomplished using a short-time Fourier transform (STFT). The process approximates the magnitude spectrum and the phase spectrum of the input audio signal with dynamic noise.

The separator 104 is used to separate speech from dynamic noise through the application of a separation mask. The separator 104 comprises a temporal convolutional network (TCN). The TCN receives the magnitude spectrum and estimates a weighting function, i.e., mask, for the magnitude spectrum. The mask is a continuous signal having values between <0, 1>, with 0 indicating all noise and 1 indicating all speech. In other words, the mask provides an indication of areas where there is speech and areas where there is noise.

The multiplier 106 (also referred to as mixer 106) receives the mask from the separator 104 and the magnitude spectrum from the encoder 102 as input. The multiplier 106 applies the mask from the separator to the magnitude spectrum of the output of the encoder 102 to achieve a denoise magnitude spectrum (i.e., speech).

The decoder 108 receives the denoise magnitude spectrum from the mixer 106 and the original phase spectrum from the encoder 102. The decoder 108 reconstructs the audio signal without dynamic noise by calculating the inverse short-time Fourier transform (iSTFT) of the denoise magnitude spectrum using the original phase spectrum of the audio signal with dynamic noise (the noisy phase spectrum) from the encoder 102.

Figure 2:
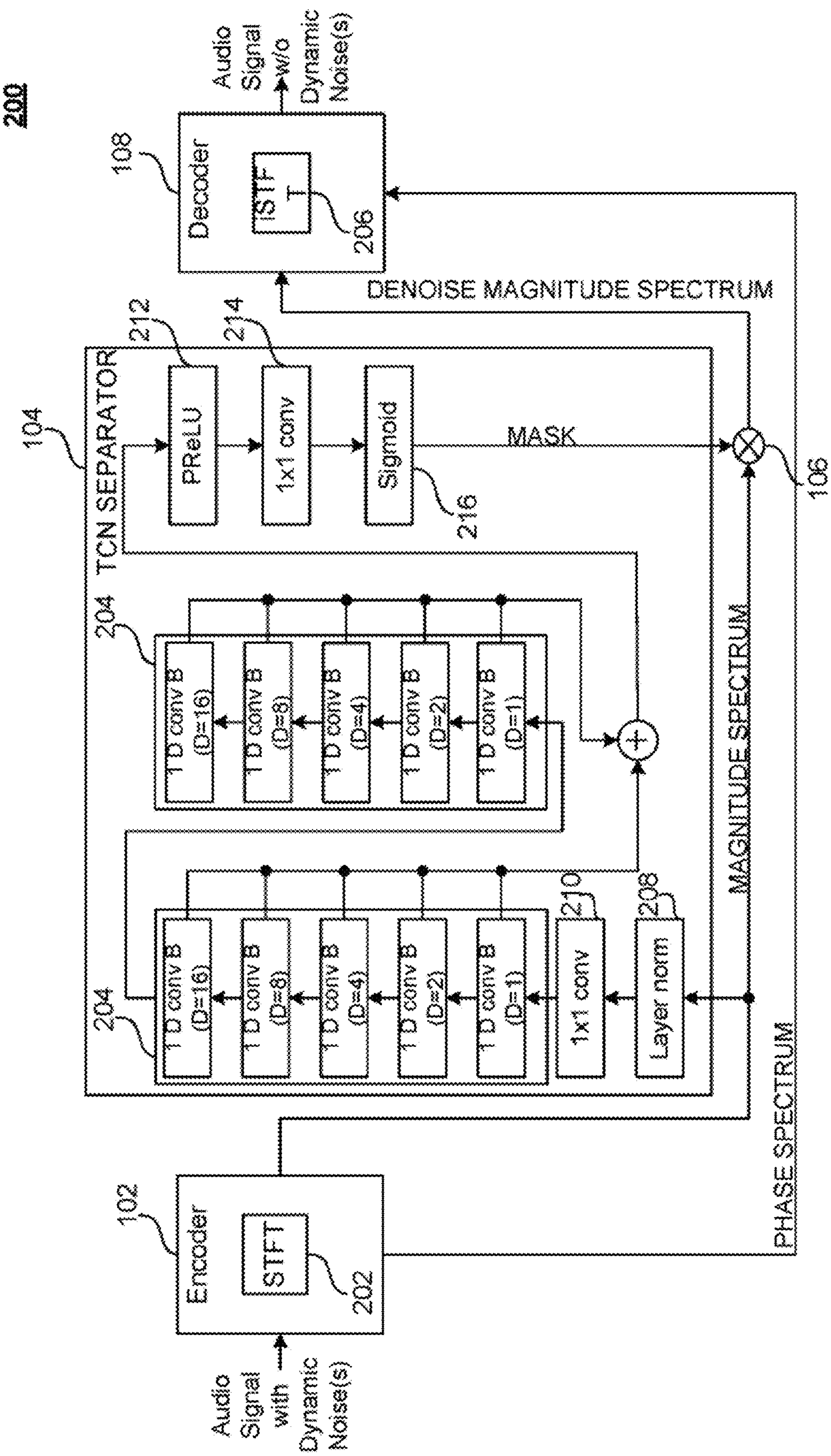
FIG. 2 is a more detailed example block diagram of a real-time dynamic noise reduction system according to an embodiment.

FIG. 2 is a more detailed example block diagram of a real-time dynamic noise reduction system 200 according to an embodiment. As previously indicated with respect to FIG. 1, the real-time dynamic noise reduction system includes the encoder 102, the TCN separator 104, the multiplier 106 and the decoder 108. As shown in FIG. 2, the encoder 102 comprises an STFT module 202 used to obtain the magnitude spectrum and the phase spectrum of the input audio signal with dynamic noise. In one embodiment, the STFT module 202 uses an FFT (Fast Fourier Transform) window of 32 ms and a hop size of 8 ms. in performance of the STFT. One skilled in the relevant art(s) would know that other FFT window sizes and/or hop sizes may be used. The decoder 108 comprises an iSTFT module 206 to reconstruct the audio signal without dynamic noise using the noisy phase spectrum from the encoder 102. The use of the STFT module 202 and the iSTFT module 206 enable good results in real-life conditions and lowers compute and memory utilization.

The TCN separator 104 comprises a layer normalization block 208, a 1×1 convolution block 210, a stack of 1-D dilated convolution blocks 204 that repeat n times, a PRELU block 212, a 1×1 convolution block 214 and a Sigmoid block 216. The layer normalization block 208 is coupled to the 1×1 convolution block 210. The 1×1 convolution block 210 is coupled to a first stack of 1-D dilated convolution blocks 204. The first stack of 1-D dilated convolution blocks 204 is coupled to a second stack of 1-D dilated convolution blocks 204. The second stack of 1-D dilated convolution blocks 204 is coupled to the PRELU block 212. The PRELU block 212 is coupled to the 1×1 convolution block 214. The 1×1 convolution block 214 is coupled to the Sigmoid block 216.

The layer normalization block 208 normalizes the distributions of intermediate layers and enables smoother gradients, faster training, and better generalization accuracy. The 1×1 convolution block 210 performs dimension reduction by controlling the depth of the input volume of the data as it passes to the next layer.

In the stack of 1-D dilated convolution blocks 204, a dilation factor increases exponentially with each layer. For X number of 1-D convolution blocks in a stack, the dilation factor for the Xth layer is $2^{X-1}$ and the stack may be repeated N times. The dilation factors increase exponentially to ensure a sufficient temporal context window needed to model long-term dependencies of the speech signal. The complexity of the TCN network is defined using two main parameters, the number of layers in a stack and the number of repetitions of the stacked layers. In one embodiment, as shown in FIG. 2, the network uses five (5) stacked layers repeated two (2) times. Having only five stacked layers and two repeats aids in reducing compute costs and memory size. (Typical TCN separators use eight stacked layers and three repeats.) As shown in FIG. 2, the dilation for a stack of 5 layers is 1, 2, 4, 8 and 16, respectively. Note that the dynamic noise reduction system was designed to be able to run on a regular PC (personal computer) as well as other smaller form factors, such as, for example, cell phones, tablets, watches, and other wearables capable of voice calls with low compute.

The output of the last layer in the last repeat of the stack of 1-D dilated convolution blocks 204 is passed to the activation function (PRELU) block 212, the 1×1 convolution block 214 and the Sigmoid block 216 for mask estimation. Together, blocks 212 through 216 estimate the separation mask for the speech signal. The Sigmoid block 216 outputs the separation mask as a continuous function with values between <0, 1>, with values of 0 representing all noise and values of 1 representing all speech.

As previously indicated, the separation is performed by multiplying the mask signal by the magnitude spectrum from the encoder 102 output to obtain the denoise magnitude spectrum and the decoder 108 reconstructs the denoise magnitude signal waveform by performing an iSTFT using the phase spectrum from the encoder 102 output.

A hybrid TCN architecture in which two (2) distinct configurations are employed for the layers in the stack of 1-D convolution blocks are used in embodiments to increase the quality of real-time inference. The two configurations include a causal configuration and a non-causal configuration. The causal configuration works well for real-time applications. With a causal configuration, no future context can be analyzed. Only knowledge from the past can be leveraged. For example, only frames that were previously captured can be used for analysis. With a non-causal configuration, the whole network context is known before hand and is given as input to the network. Having access to future frames results in better performance, but there is a tradeoff between latency and performance. The non-causal configuration is applicable for off-line processing. The causal configuration of the network does not provide as good results as the non-causal configuration due to the fact that the network future context is unknown.

In embodiments, the two configurations are merged into one to create the hybrid TCN. The hybrid TCN consists of non-causal and causal layers. It introduces a trade-off between latency and performance. The longer the latency, the better the performance of the network because the TCN can benefit from the information conveyed through the latency mechanism. In other words, the non-causal configuration may be used to achieve lookahead by providing the network with additional information about the signal that may provide better separation masks.

The hybrid solution introduces latency that depends on the number of convolution layers that will be configured as non-causal, the dilation factor, and the FFT window and hop size. Table 1 lists the amount of latency for the number of non-causal layers in a hybrid TCN.

TABLE 1

| Number of non-causal layers | Latency [ms] |
|---|---|
| 1 | 8 |
| 2 | 16 |
| 3 | 32 |
| 4 | 64 |
| 5 | 128 |

As shown in Table 1, non-causal layers from 1 to 5 in a hybrid TCN configuration of five convolution layers with dilation equal to $2^{X-1}$ (with X being the number of the layer in the stack), an FFT window of 32 ms (millisecond) and a hop size of 8 ms results in a latency of 8 to 128 ms. In one embodiment, a hybrid TCN configuration of five stacked 1-D convolution blocks with three (3) non-causal layers and two (2) causal layers is used. This hybrid TCN configuration adds future data to the network which results in an increase in signal quality with a latency of 32 ms.

Figure 3:
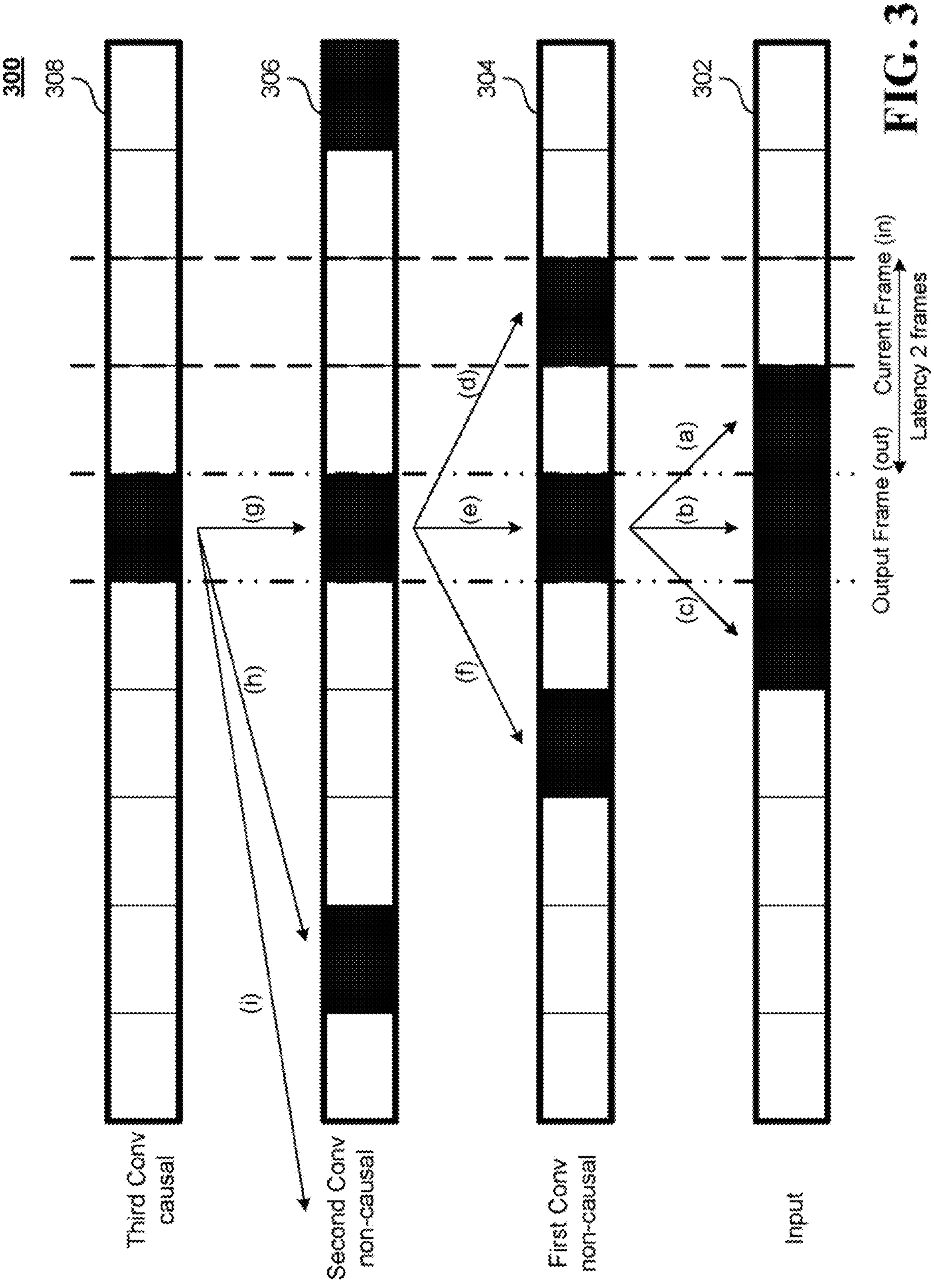
FIG. 3 is a diagram of an example hybrid TCN network illustrating the relationship between data in consecutive layers according to an embodiment.

FIG. 3 is a diagram of an example hybrid TCN network illustrating the relationship between data in consecutive layers according to an embodiment. As shown in FIG. 3, the non-causal layers are located on the lower layers while the causal layer is located above the non-causal layers. The bottom layer 302 is an input layer.

The next layer up from the input layer 302 is a first convolution layer 304. Layer 304 is non-causal, and therefore has the ability to look forward (i.e., lookahead) and backward. This is illustrated by arrows (a), (b) and (c). Arrow (a) illustrates looking ahead, while arrow (c) is looking backward. The first convolution layer 304 can utilize one future frame for output (b) with a latency of approximately one frame. Layer 304 may also look backward at historical data as well as shown by arrow (c).

The next layer above the first convolution layer 304 is a second convolution layer 306. Layer 306 is also non-causal, and thus, has the ability to look forward (i.e, lookahead) and backward. This is illustrated by arrows (d), (e) and (f). Arrow (d) illustrates looking ahead, while arrow (f) looking backward. The second convolution layer 306 can utilize one future frame for output (e) with a latency of two frames. Layer 306 may also look backward at historical data as well as shown by arrow (f).

The top layer 308, above second convolution layer 306, illustrates a third convolution layer. The third convolution layer 308 is causal, and therefore, only has the ability to look backward at historical data. This is illustrated using arrows (h) and (i).

Embodiments of the TCN use a novel cost function defined as "frequency SNR" or fSNR that is used to calculate loss during training. The cost function contains target signal power that enables the estimated error to not be affected by varying signal levels during training. The cost function is calculated in the frequency domain. While time domain loss functions are capable of outstanding results, this does not hold true for realistic, reverberant and out-of-domain noise conditions. That is, when the signal mask estimation is suboptimal, the time domain loss penalizes errors in phase estimation, while a minimum still exists as a solution for magnitude-only estimates. The cost function employs a logarithmic scale. The logarithmic scale helps to properly balance quiet and loud magnitudes. The cost function is defined as:

$$fSNR(X, \hat{X}) = 10 * \log\left(\frac{\sum_{k,n} X_{k,n}^2}{\sum_{k,n}(\hat{X} - X)^2 + \varepsilon} + \varepsilon\right)$$

where:

X—target signal magnitude SFTF $\hat{X}$—estimated signal magnitude STFT k—STFT bins n—STFT frames ε—for numerical stability The LOSS fucntion is a variant of a weighted-*SDR*, and is defined as:

$$\text{LOSS} = \alpha * fSNR(S, \hat{S}) + (1 - \alpha) * fSNR(N, \hat{N})$$

where:

$$\alpha = \frac{\|S\|^2}{\|S\|^2 + \|N\|^2 + \varepsilon}$$

$$\alpha \in \langle 0.5, 1 \rangle$$

This allows for automatic balance between signal and noise reconstructions, while limiting the lower bound to avoid noise overweight under non-ideal training datasets. Training the TCN using the above defined LOSS function helped to boost the overall performance of the TCN separator.

In order to improve real-time performance, a grouping mechanism is implemented. The grouping mechanism collects a certain amount of frames before an inference can be performed, and the inference may be performed on all of the frames simultaneously. This requires less computation over a period of time, but it also introduces some latency because the system must wait until the required number of frames are received to perform the computation. The amount of frames to be collected prior to computation may be pre-determined.

Figure 4:
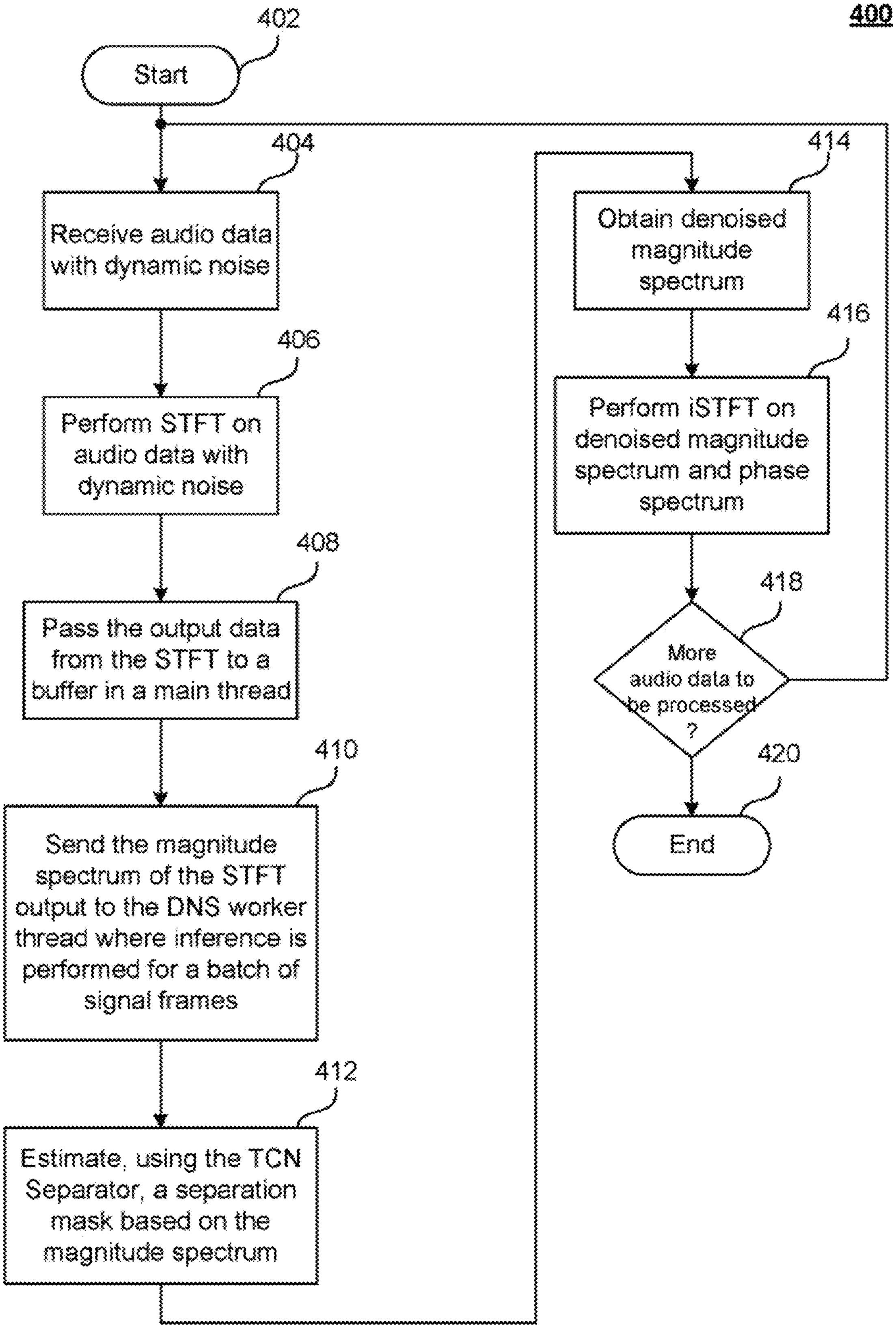
FIG. 4 is a flow diagram of an example method of performing real-time DNS processing according to an embodiment.

FIG. 4 is a flow diagram of an example method 400 of performing real-time DNS processing according to an embodiment. The method 400 may generally be implemented in a system such as, for example, the real-time dynamic noise reduction system 200 as shown in FIG. 2. More particularly, the method 400 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), and fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instruction, instruction set architecture (ISA) instructions, machine instruction, machine depended instruction, microcode, state setting data, configuration data for integrated circuitry, state information that personalizes electronic circuitry and/or other structural components that are native to hardware (e.g., host processor, central processing unit (CPU), microcontroller, etc.).

The process begins in block 402, where the process immediately proceeds to block 404.

In block 404, the encoder receives audio data with dynamic noise as input. The process then proceeds to block 406.

In block 406, an STFT is performed on the audio data with dynamic noise, resulting in a magnitude spectrum and a phase spectrum. In one embodiment, the encoder uses an FFT window of 32 ms and a hop size of 8 ms. in performance of the STFT. The process then proceeds to block 408.

In block 408, with the use of two threads working in parallel, the output data from the STFT, that is, the magnitude spectrum and the phase spectrum, are passed to a buffer in a main thread. The process then proceeds to block 410.

In block 410, the buffer triggers the operation of the TCN to perform DNS in a DNS worker thread. The buffer passes the magnitude spectrum of the STFT output to the DNS worker thread where inference is performed for a batch of signal frames. In one embodiment, frame grouping is used. For example, the buffer triggers the DNS worker thread every k frames. In other words, inference is performed every k frames. This limits CPU load over time by a factor of k. In embodiments, grouping size k is configurable. Grouping introduces latency equal to:

$$L_G = k - 1$$

where:

$L_G$—grouping latency (in frames)

k—grouping size (in frames).

In one embodiment, with k=4 frames, 32 frames are provided to the DNS worker thread every 4 frames. The process then proceeds to block 412.

In block 412, the TCN Separator estimates a separation mask based on the magnitude spectrum. The separation mask is achieved using deep learning. As previously indicated, the TCN Separator consists of X stacked 1-D dilated convolution blocks that repeat N times. In one embodiment, X=5 and N=2, thus providing 5 layers of 1-D dilated convolution blocks that are repeated twice, resulting in 10 total layers of 1-D dilated convolution blocks. Each of these 1-D dilated convolution blocks extend the frequency context backward and forward by a factor equal to the dilation factor of the convolution layer. As previously indicated, in one embodiment, 3 of the 5 1-D dilated convolution layers are non-causal, with the remaining two layers being causal. Having the ability to lookahead with non-causal layers enables the network to have better insight about the signal to allow better separation.

The output of the last layer is passed to an activation function (PRELU), a 1×1 convolution, and a Sigmoid function, all of which are well known to one skilled in the relevant art(s), to generate the separation mask used to separate speech from the dynamic noise. The separation mask is a continuous function with values between <0, 1>. Values equal to 0 are indicative of all noise. Values equal to 1 are indicative of all speech. The process then proceeds to block 414.

In block 414, the separation mask is multiplied with the magnitude spectrum to obtain a denoised magnitude spectrum. The process then proceeds to block 416.

In block 416, the denoised magnitude spectrum is passed to the main thread where the decoder recombines the denoised magnitude with the input buffered phase spectrum using an iSTFT and places the result in an output buffer. Note that the output buffer is initially filled with zeroes to match the latency introduced by the grouping mechanism. The process then proceeds to decision block 418.

In decision block 418, it is determined whether more audio data is available to be processed. If it is determined that more audio data is available to be processed, the process proceeds back to block 404. If it is determined that no more audio data is available to be processed, the process then proceeds to block 420, where the process ends.

Real-time processing of embodiments resulted in lower overall latency. For example, in an embodiment using a hybrid TCN with STFT encoder/decoder technology and frame grouping size, the overall latency of the DNS solution resulted in 61 ms; 32 ms from the latency of the hybrid TCN, 24 ms from a grouping size of 4 (four) frames, and approximately 5 ms from the duration of inference (with the use of an i5-6440HQ Intel® CPU). The latency of other systems can be as much as 256 ms.

Figure 5:
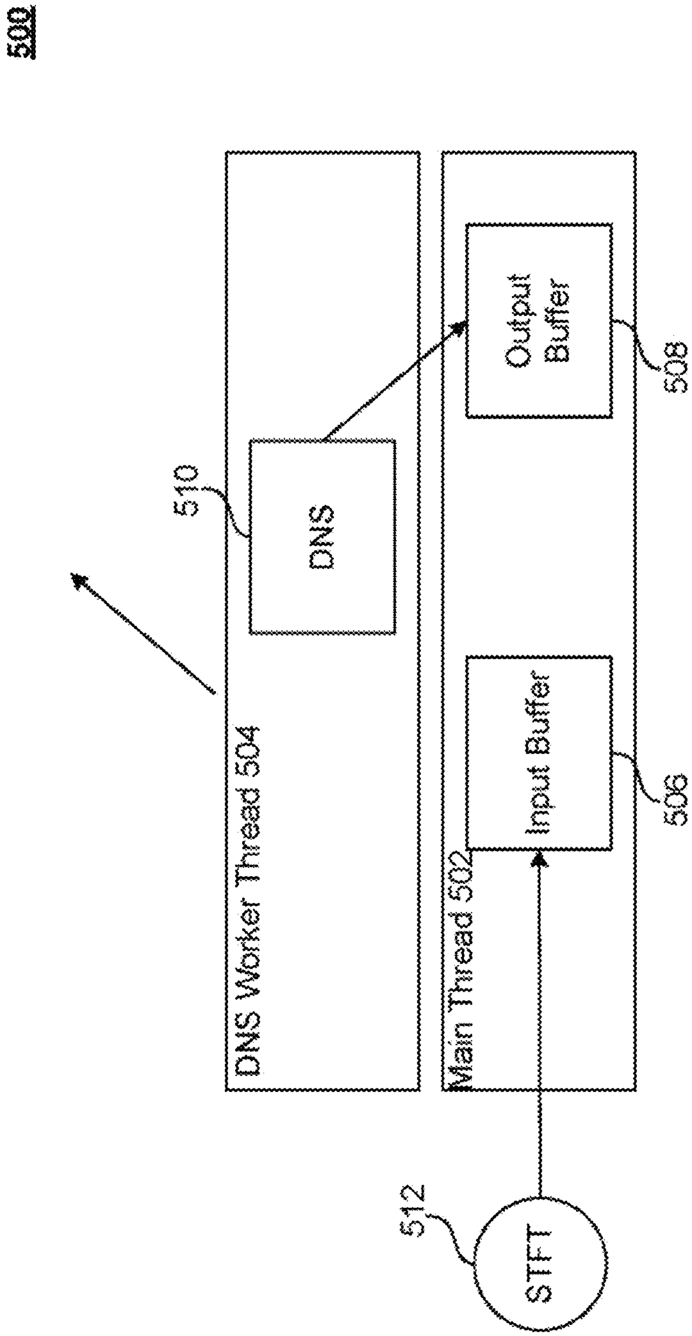
FIG. 5 is an illustration of an efficient real-time DNS processing implementation according to an embodiment.

FIG. 5 is an illustration of a real-time DNS implementation 500 according to an embodiment. As previously indicated, the real-time DNS implementation 500 comprises two threads, a main thread 502 and a DNS worker thread 504. The main thread 502 receives the audio data and responds with the noise free audio data as output to the user. The DNS worker thread 504 receives all of the audio frames from the main thread 502, performs all of the computations for the DNS in the background and sends the noise free audio to the main thread 502. The main thread 502 comprises an input buffer 506 and an output buffer 508. The DNS worker thread 504 comprises a DNS 510. The main thread 502 and the DNS worker thread 504 operate in parallel.

STFT data 512 consisting of a magnitude spectrum and a phase spectrum from encoder 102 is passed to a buffer 506 in the main thread 502. The magnitude spectrum is passed as input to the DNS 510 in DNS worker thread 504 and the phase spectrum is buffered. The buffer 506 triggers the DNS 510 every k frames. The output buffer 508 is initially filled with zeroes to match the latency introduced by frame grouping. The DNS 510 performs dynamic noise suppression on the input frames that results in a denoised magnitude spectrum as output. The output from the DNS 510 is passed to the main thread 502 to be recombined with the buffered phase spectrum in the output buffer 508.

A DNS model embodiment was compared with a state-of-the-art Conv-TasNet.

The state-of-the-art Conv-TasNet uses encoder/decoder architecture consisting of a 1 D convolutional layer, which is well known to one skilled in the relevant art(s). In order to compare an embodiment of the DNS model with the state-of-the-art Conv-TasNet, modifications were made to the original architecture of the Conv-TasNet. The original Conv-TasNet was designed for blind speech separation (BSS) and since the network size was actually to be to perform inference in real time, the TCN of the Conv-TasNet was reduced to five stacked layers repeated two times from eight stacked layers repeated three times in order to get the network size to an embodiment of the DNS model. Also, instead of an SI-SNR loss function, a weighted-SDR loss function was used to preserve speech signal levels.

POLQA (Perceptual Objective Listening Quality Analysis) MOS (Mean Opinion Score) scores, ranging from 1 to 5, with one being bad quality and five being excellent quality, were computed on recordings from real devices. Recordings were made with signal-to-noise ratio levels above and below OdB. The dynamic noises used were baby cry, dog bark, sirens, doorbells and horns. As shown in Table 2, the DNS model outperformed the state-of-the-art Conv-TasNet architecture. The DNS model also required eight times less compute power which is attributed to the use of STFT/ISTFT for the encoder/decoder architecture.

TABLE 2

| | MOS Scores | | |
|---|---|---|---|
| | SNR >0 dB Baby Cry, Dog Bark | SNR <0 dB Baby Cry, Dog Bark | SNR >0 dB Siren, Doorbell, Horn |
| Unprocessed Signal | 2.6142 | 2.3294 | 2.6844 |
| Conv-TasNet | 3.2213 | 1.0074 | 1.0522 |
| DNS | 3.4113 | 3.4885 | 3.6875 |

Figure 6:
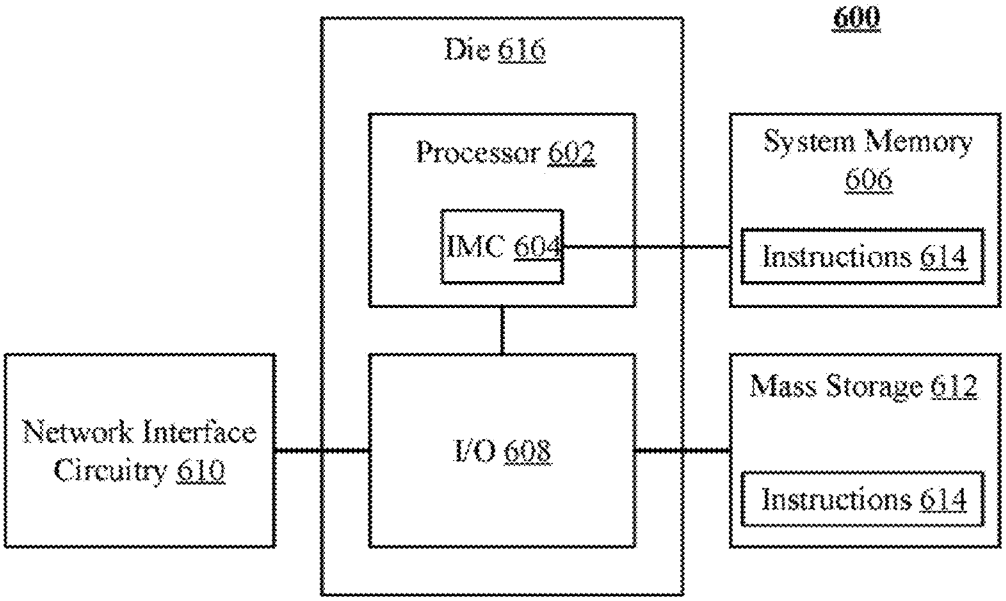
FIG. 6 is a block diagram of an example of another dynamic noise reduction system according to an embodiment.

FIG. 6 shows an example of another dynamic noise reduction system 600 that may be readily substituted for the dynamic noise reduction system shown above with reference to FIG. 2. The illustrated system 600 includes a processor 602 (e.g., host processor, central processing unit/CPU) having an integrated memory controller (IMC) 604 coupled to a system memory 606 (e.g., volatile memory, dynamic random access memory/DRAM). The processor 602 may also be coupled to an input/output (I/O) module 608 that communicates with network interface circuitry 610 (e.g., network controller, network interface card/NIC) and mass storage 612 (non-volatile memory/NVM, hard disk drive/HDD, optical disk, solid state disk/SSD, flash memory). The network interface circuitry 610 may receive an audio signal such as, for example, an audio signal having dynamic noise from a voice call in which the dynamic noise is to be removed from the audio signal (as shown in FIG. 4), wherein the system memory 606 and/or the mass storage 612 may be memory devices that store instructions 614, which when executed by the processor 602, cause the system 600 to perform one or more aspects of the method 400 (FIG. 4), already discussed. Thus, execution of the instructions 614 may cause the system 600 to receive an input audio signal, the input audio signal including speech and dynamic noise; perform a short-time Fourier transform on the audio signal to generate a magnitude spectrum and a phase spectrum; estimate, by a temporal convolution network (TCN), a separation mask based on the magnitude spectrum using deep learning, wherein the TCN is trained using a frequency SNR cost function used to calculate loss during training; mix the separation mask with the magnitude spectrum to generate a denoise magnitude spectrum; and perform an inverse short-time Fourier transform using the denoise magnitude spectrum and the phase spectrum to reconstruct the input audio signal without the dynamic noise.

The processor 602 and the IO module 608 may be incorporated into a shared die 616 as a system on chip (SoC).

Figure 7:
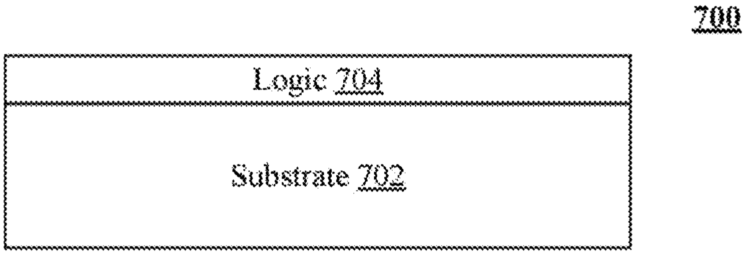
FIG. 7 is an illustration of an example of a semiconductor package apparatus according to an embodiment.

FIG. 7 shows a semiconductor package apparatus 700 (e.g., chip) that includes a substrate 702 (e.g., silicon, sapphire, gallium arsenide) and logic 704 (e.g., transistor array and other integrated circuit/IC components) coupled to the substrate 702. The logic 704, which may be implemented in configurable logic and/or fixed-functionality logic hardware, may generally implement one or more aspects of the method 400 (FIG. 4), already discussed.

Figure 8:
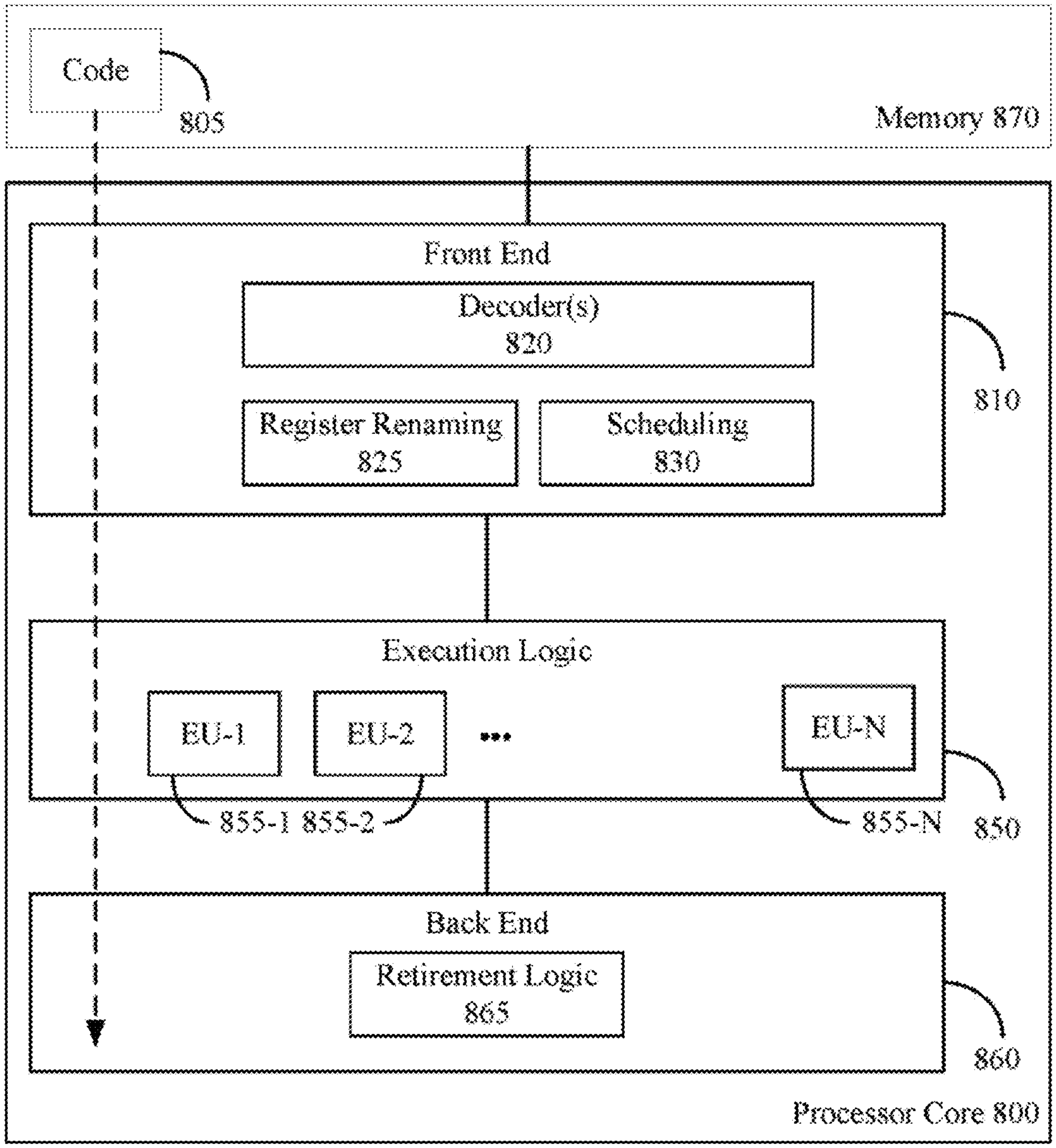
FIG. 8 is a block diagram of an exemplary processor according to an embodiment.

FIG. 8 illustrates a processor core 800 according to one embodiment. The processor core 800 may be the core for any type of processor, such as a micro-processor, an embedded processor, a digital signal processor (DSP), a network processor, or other device to execute code. Although only one processor core 800 is illustrated in FIG. 8, a processing element may alternatively include more than one of the processor core 800 illustrated in FIG. 8. The processor core 800 may be a single-threaded core or, for at least one embodiment, the processor core 800 may be multithreaded in that it may include more than one hardware thread context (or "logical processor") per core.

FIG. 8 also illustrates a memory 870 coupled to the processor core 800. The memory 870 may be any of a wide variety of memories (including various layers of memory hierarchy) as are known or otherwise available to those of skill in the art. The memory 870 may include one or more code 805 instruction(s) to be executed by the processor core 800, wherein the code 805 may implement the method 400 (FIG. 4), already discussed. The processor core 800 follows a program sequence of instructions indicated by the code 805. Each instruction may enter a front end portion 810 and be processed by one or more decoders 820. The decoder 820 may generate as its output a micro operation such as a fixed width micro operation in a predefined format, or may generate other instructions, microinstructions, or control signals which reflect the original code instruction. The illustrated front end portion 810 also includes register renaming logic 825 and scheduling logic 830, which generally allocate resources and queue the operation corresponding to the convert instruction for execution.

The processor core 800 is shown including execution logic 850 having a set of execution units 855-1 through 855-N. Some embodiments may include a number of execution units dedicated to specific functions or sets of functions. Other embodiments may include only one execution unit or one execution unit that can perform a particular function. The illustrated execution logic 850 performs the operations specified by code instructions.

After completion of execution of the operations specified by the code instructions, back end logic 860 retires the instructions of the code 805. In one embodiment, the processor core 800 allows out of order execution but requires in order retirement of instructions. Retirement logic 865 may take a variety of forms as known to those of skill in the art (e.g., re-order buffers or the like). In this manner, the processor core 800 is transformed during execution of the code 805, at least in terms of the output generated by the decoder, the hardware registers and tables utilized by the register renaming logic 825, and any registers (not shown) modified by the execution logic 850.

Although not illustrated in FIG. 8, a processing element may include other elements on chip with the processor core 800. For example, a processing element may include memory control logic along with the processor core 800. The processing element may include I/O control logic and/or may include I/O control logic integrated with memory control logic. The processing element may also include one or more caches.

Figure 9:
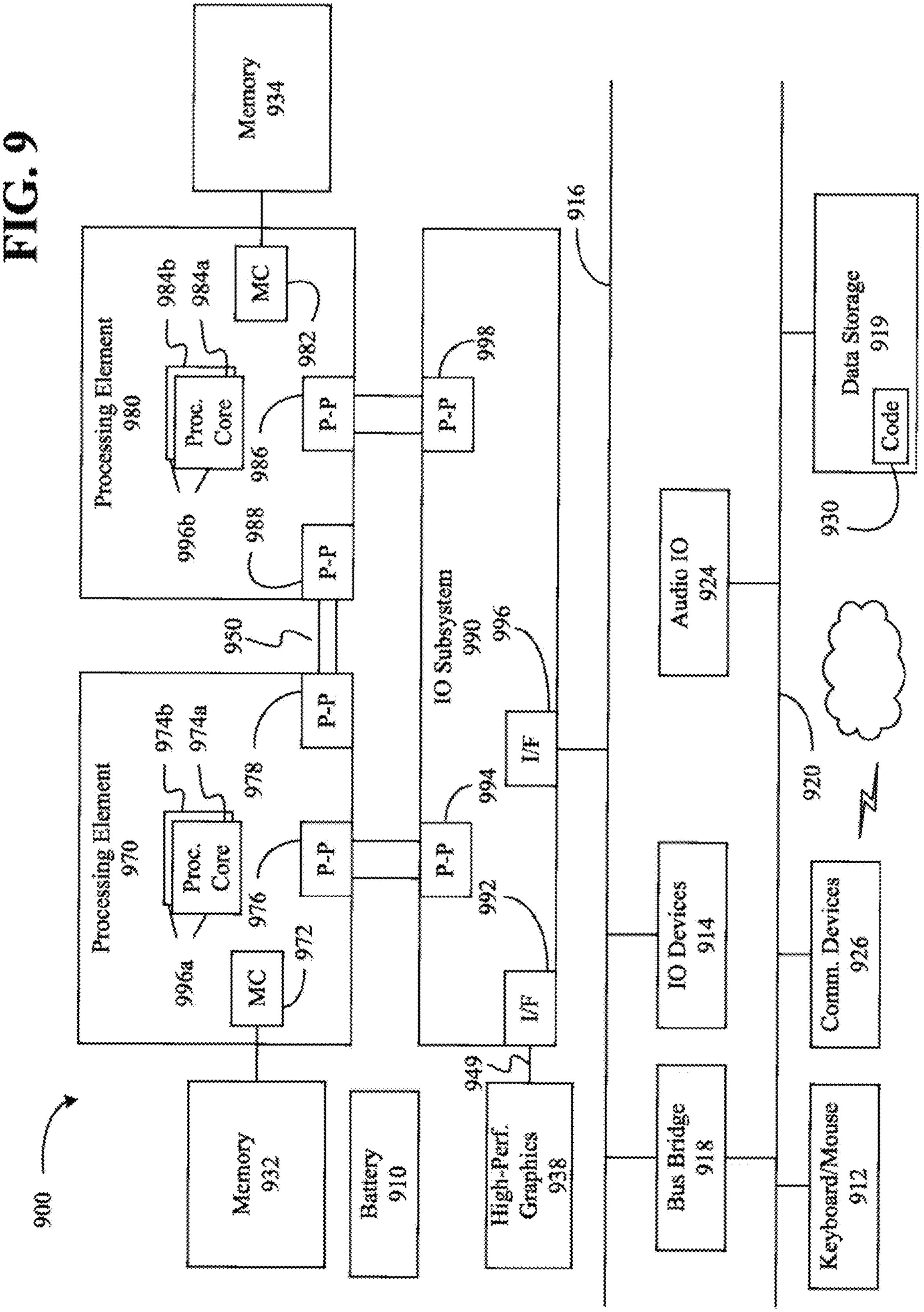
FIG. 9 is a block diagram of an exemplary computing system according to an embodiment.

Referring now to FIG. 9, shown is a block diagram of a computing system 900 in accordance with an embodiment. Shown in FIG. 9 is a multiprocessor system 900 that includes a first processing element 970 and a second processing element 980. While two processing elements 970 and 980 are shown, it is to be understood that an embodiment of the system 900 may also include only one such processing element.

The system 900 is illustrated as a point-to-point interconnect system, wherein the first processing element 970 and the second processing element 980 are coupled via a point-to-point interconnect 950. It should be understood that any or all of the interconnects illustrated in FIG. 9 may be implemented as a multi-drop bus rather than point-to-point interconnect.

As shown in FIG. 9, each of processing elements 970 and 980 may be multicore processors, including first and second processor cores (i.e., processor cores 974*a* and 974*b* and processor cores 984*a* and 984*b*). Such cores 974*a*, 974*b*, 984*a*, 984*b* may be configured to execute instruction code in a manner similar to that discussed above in connection with FIG. 8.

Each processing element 970, 980 may include at least one shared cache 996*a*, 996*b*. The shared cache 996*a*, 996*b* may store data (e.g., instructions) that are utilized by one or more components of the processor, such as the cores 974*a*, 974*b* and 984*a*, 984*b*, respectively. For example, the shared cache 996*a*, 996*b* may locally cache data stored in a memory 932, 934 for faster access by components of the processor. In one or more embodiments, the shared cache 996*a*, 996*b* may include one or more mid-level caches, such as level 2 (L2), level 3 (L3), level 4 (L4), or other levels of cache, a last level cache (LLC), and/or combinations thereof.

While shown with only two processing elements 970, 980, it is to be understood that the scope of the embodiments are not so limited. In other embodiments, one or more additional processing elements may be present in a given processor. Alternatively, one or more of processing elements 970, 980 may be an element other than a processor, such as an accelerator or a field programmable gate array. For example, additional processing element(s) may include additional processors(s) that are the same as a first processor 970, additional processor(s) that are heterogeneous or asymmetric to processor a first processor 970, accelerators (such as, e.g., graphics accelerators or digital signal processing (DSP) units), field programmable gate arrays, or any other processing element. There can be a variety of differences between the processing elements 970, 980 in terms of a spectrum of metrics of merit including architectural, micro architectural, thermal, power consumption characteristics, and the like. These differences may effectively manifest themselves as asymmetry and heterogeneity amongst the processing elements 970, 980. For at least one embodiment, the various processing elements 970, 980 may reside in the same die package.

The first processing element 970 may further include memory controller logic (MC) 972 and point-to-point (P-P) interfaces 976 and 978. Similarly, the second processing element 980 may include a MC 982 and P-P interfaces 986 and 988. As shown in FIG. 9, MC's 972 and 982 couple the processors to respective memories, namely a memory 932 and a memory 934, which may be portions of main memory locally attached to the respective processors. While the MC 972 and 982 is illustrated as integrated into the processing elements 970, 980, for alternative embodiments the MC logic may be discrete logic outside the processing elements 970, 980 rather than integrated therein.

The first processing element 970 and the second processing element 980 may be coupled to an I/O subsystem 990 via P-P interconnects 976 986, respectively. As shown in FIG. 9, the I/O subsystem 990 includes P-P interfaces 994 and 998. Furthermore, I/O subsystem 990 includes an interface 992 to couple I/O subsystem 990 with a high performance graphics engine 938. In one embodiment, bus 949 may be used to couple the graphics engine 938 to the I/O subsystem 990. Alternately, a point-to-point interconnect may couple these components.

In turn, I/O subsystem 990 may be coupled to a first bus 916 via an interface 996. In one embodiment, the first bus 916 may be a Peripheral Component Interconnect (PCI) bus, or a bus such as a PCI Express bus or another third generation I/O interconnect bus, although the scope of the embodiments are not so limited.

As shown in FIG. 9, various I/O devices 914 (e.g., biometric scanners, speakers, cameras, sensors) may be coupled to the first bus 916, along with a bus bridge 918 which may couple the first bus 916 to a second bus 920. In one embodiment, the second bus 920 may be a low pin count (LPC) bus. Various devices may be coupled to the second bus 920 including, for example, a keyboard/mouse 912, communication device(s) 926, and a data storage unit 919 such as a disk drive or other mass storage device which may include code 930, in one embodiment. The illustrated code 930 may implement the method 400 (FIG. 4), already discussed, and may be similar to the code 805 (FIG. 8), already discussed. Further, an audio I/O 924 may be coupled to second bus 920 and a battery 910 may supply power to the computing system 900.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include a dynamic noise reduction system, comprising an encoder comprising a short-time Fourier transform module to determine a magnitude spectrum and a phase spectrum of an input audio signal, the input audio signal comprising speech and dynamic noise; a separator, coupled to the encoder, comprising a temporal convolution network (TCN) used to develop a separation mask using the magnitude spectrum as input, wherein the TCN is trained using a frequency SNR function used to calculate loss during training; a mixer, coupled to the separator, to multiply the separation mask with the magnitude spectrum to separate the speech from the dynamic noise to obtain a denoise magnitude spectrum; and a decoder, coupled to the mixer and the encoder, comprising an inverse short-time Fourier transform module to reconstruct the input audio signal without the dynamic noise using the denoise magnitude spectrum and the phase spectrum.

Example 2 may include the system of example 1, wherein the TCN comprises non-causal convolution layers merged with causal convolution layers to form a hybrid TCN architecture, the hybrid TCN architecture to improve performance of the separation mask.

Example 3 may include the system of example 1, wherein the dynamic noise reduction system operates in real-time, implementing a grouping mechanism to collect a pre-determined number of frames as a group of frames and perform an inference on the group of frames simultaneously to reduce computational requirements.

Example 4 may include the system of example 1, wherein the TCN comprises at least one stack of 1-D dilated convolution blocks that repeat n times.

Example 5 may include the system of example 4, wherein the at least one stack of 1-D dilated convolution blocks includes five (5) convolution layers that repeat two times.

Example 6 may include the system of example 1, wherein the frequency SNR cost function includes target signal power that prevents an estimated error from being affected by varying signal levels during training.

Example 7 may include the system of example 1, wherein the frequency SNR cost function includes a logarithmic scale to balance quiet and loud magnitudes.

Example 8 may include the system of example 1, wherein the cost function comprises $$fSNR(X, \hat{X}) = 10 * \log\left(\frac{\sum_{k,n} X_{k,n}^2}{\sum_{k,n} (\hat{X} - X)^2 + \varepsilon} + \varepsilon\right),$$

with X comprising target signal magnitude SFTF, $\hat{X}$ comprising estimated signal magnitude STFT, k comprising STFT bins, n comprising STFT frames, and ε comprising numerical stability.

Example 9 may include the system of example 1, wherein the input audio signal comprises an audio signal from a voice call.

Example 10 may include the system of example 1, wherein the dynamic noise reduction system is executable on small form factor devices capable of voice calls.

Example 11 may include a method for dynamic noise reduction, comprising receiving, by an encoder, an input audio signal, the input audio signal including speech and dynamic noise; performing, by the encoder, a short-time Fourier transform on the audio signal to generate a magnitude spectrum and a phase spectrum; estimating, by a temporal convolution network (TCN), a separation mask based on the magnitude spectrum using deep learning, wherein the TCN is trained using a frequency SNR cost function used to calculate loss during training; mixing the separation mask with the magnitude spectrum to generate a denoise magnitude spectrum; and performing, by a decoder, an inverse short-time Fourier transform using the denoise magnitude spectrum and the phase spectrum to reconstruct the input audio signal without the dynamic noise.

Example 12 may include the method of example 11, wherein the TCN comprises non-causal convolution layers merged with causal convolution layers to form a hybrid TCN architecture, the hybrid TCN architecture to improve performance of the separation mask.

Example 13 may include the method of example 11, wherein the dynamic noise reduction method operates in real-time, implementing a grouping mechanism to collect a pre-determined number of frames as a group of frames and perform an inference on the group of frames simultaneously to reduce computational requirements.

Example 14 may include the method of example 11, wherein the TCN comprises at least one stack of 1-D dilated convolution blocks that repeat n times to estimate the separation mask using the deep learning.

Example 15 may include the method of example 14, wherein the at least one stack of 1-D dilated convolution blocks includes five (5) convolution layers that repeat two times.

Example 16 may include the method of example 11, wherein the frequency SNR cost function includes target signal power that prevents an estimated error from being affected by varying signal levels during training.

Example 17 may include the method of example 11, wherein the frequency SNR cost function includes a logarithmic scale to balance quiet and loud magnitudes.

Example 18 may include the method of example 11, wherein the cost function comprises $$fSNR(X, \hat{X}) = 10 * \log\left(\frac{\sum_{k,n} X_{k,n}^2}{\sum_{k,n} (\hat{X} - X)^2 + \varepsilon} + \varepsilon\right),$$

with X comprising target signal magnitude SFTF, $\hat{X}$ comprising estimated signal magnitude STFT, k comprising STFT bins, n comprising STFT frames, and ε comprising numerical stability.

Example 19 may include the method of example 11, wherein the input audio signal comprises an audio signal from a voice call.

Example 20 may include the method of example 11, wherein the dynamic noise reduction method is executable on small form factor devices capable of voice calls.

Example 21 may include at least one computer readable medium, comprising a set of instructions, which when executed by one or more computing devices, cause the one or more computing devices to receive, by an encoder, an input audio signal, the input audio signal including speech and dynamic noise; perform, by the encoder, a short-time Fourier transform on the audio signal to generate a magnitude spectrum and a phase spectrum; estimate, by a temporal convolution network (TCN), a separation mask based on the magnitude spectrum using deep learning, wherein the TCN is trained using a frequency SNR cost function used to calculate loss during training; mix the separation mask with the magnitude spectrum to generate a denoise magnitude spectrum; and perform, by a decoder, an inverse short-time Fourier transform using the denoise magnitude spectrum and the phase spectrum to reconstruct the input audio signal without the dynamic noise.

Example 22 may include the at least one computer readable medium of example 21, wherein the TCN comprises non-causal convolution layers merged with causal convolution layers to form a hybrid TCN architecture, the hybrid TCN architecture to improve performance of the separation mask.

Example 23 may include the at least one computer readable medium of example 21, wherein dynamic noise reduction operates in real-time, implementing a grouping mechanism to collect a pre-determined number of frames as a group of frames and perform an inference on the group of frames simultaneously to reduce computational requirements.

Example 24 may include the at least one computer readable medium of example 21, wherein the TCN comprises at least one stack of 1-D dilated convolution blocks that repeat n times to estimate the separation mask using the deep learning.

Example 25 may include the at least one computer readable medium of example 24, wherein the at least one stack of 1-D dilated convolution blocks includes five (5) convolution layers that repeat two times.

Example 26 may include the at least one computer readable medium of example 21, wherein the frequency SNR cost function includes target signal power that prevents an estimated error from being affected by varying signal levels during training.

Example 27 may include the at least one computer readable medium of example 21, wherein the frequency SNR cost function includes a logarithmic scale to balance quiet and loud magnitudes.

Example 28 may include the at least one computer readable medium of example 21, wherein the cost function comprises $$fSNR(X, \hat{X}) = 10 * \log\left(\frac{\sum_{k,n} X_{k,n}^2}{\sum_{k,n} (\hat{X} - X)^2 + \varepsilon} + \varepsilon\right),$$

with X comprising target signal magnitude SFTF, $\hat{X}$ comprising estimated signal magnitude STFT, k comprising STFT bins, n comprising STFT frames, and ε comprising numerical stability.

Example 29 may include the at least one computer readable medium of example 21, wherein the input audio signal comprises an audio signal from a voice call.

Example 30 may include the at least one computer readable medium of example 21, wherein dynamic noise reduction is executable on small form factor devices capable of voice calls.

Example 31 may include a dynamic noise reduction apparatus comprising a substrate; and logic coupled to the substrate, wherein the logic is implemented in one or more of configurable logic or fixed-functionality hardware logic, the logic including an encoder comprising a short-time Fourier transform module to determine a magnitude spectrum and a phase spectrum of an input audio signal, the input audio signal comprising speech and dynamic noise; a separator, coupled to the encoder, comprising a temporal convolution network (TCN) used to develop a separation mask using the magnitude spectrum as input, wherein the TCN is trained using a frequency SNR function used to calculate loss during training; a mixer, coupled to the separator, to multiply the separation mask with the magnitude spectrum to separate the speech from the dynamic noise to obtain a denoise magnitude spectrum; and a decoder, coupled to the mixer and the encoder, comprising an inverse short-time Fourier transform module to reconstruct the input audio signal without the dynamic noise using the denoise magnitude spectrum and the phase spectrum.

Example 32 may include the apparatus of example 31, wherein the TCN comprises non-causal convolution layers merged with causal convolution layers to form a hybrid TCN architecture, the hybrid TCN architecture to improve performance of the separation mask.

Example 33 may include the apparatus of example 31, wherein the dynamic noise reduction system operates in real-time, implementing a grouping mechanism to collect a pre-determined number of frames as a group of frames and perform an inference on the group of frames simultaneously to reduce computational requirements.

Example 34 may include the apparatus of example 31, wherein the TCN comprises at least one stack of 1-D dilated convolution blocks that repeat n times.

Example 35 may include the apparatus of example 34, wherein the at least one stack of 1-D dilated convolution blocks includes five (5) convolution layers that repeat two times.

Example 36 may include the apparatus of example 31, wherein the frequency SNR cost function includes target signal power that prevents an estimated error from being affected by varying signal levels during training.

Example 37 may include the apparatus of example 31, wherein the frequency SNR cost function includes a logarithmic scale to balance quiet and loud magnitudes.

Example 38 may include the apparatus of example 31, wherein the cost function comprises $$fSNR(X, \hat{X}) = 10 * \log\left(\frac{\sum_{k,n} X_{k,n}^2}{\sum_{k,n} (\hat{X} - X)^2 + \varepsilon} + \varepsilon\right),$$

with X comprising target signal magnitude SFTF, $\hat{X}$ comprising estimated signal magnitude STFT, k comprising STFT bins, n comprising STFT frames, and ε comprising numerical stability.

Example 39 may include the apparatus of example 31, wherein the input audio signal comprises an audio signal from a voice call.

Example 40 may include the apparatus of example 31, wherein the dynamic noise reduction system is executable on small form factor devices capable of voice calls.

Example 41 may include at least one computer readable medium comprising a set of instructions, which when executed by a computing system, cause the computing system to perform the method of any one of examples 11 to 20.

Example 42 may include an apparatus comprising means for performing the method of any one of examples 11 to 20.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A sound separation system, comprising:

an encoder comprising a short-time Fourier transform module to determine a first magnitude spectrum and a phase spectrum of an input audio signal, the input audio signal including voice;

a separator, coupled to the encoder, comprising a temporal convolution network (TCN) used to develop a separation mask using the first magnitude spectrum as input, wherein the TCN includes non-causal convolution layers and causal convolution layers to form a hybrid TCN architecture; and a mixer, coupled to the separator, to multiply the separation mask with the magnitude spectrum to separate the voice from the input audio signal to obtain a second magnitude spectrum for the voice.

2. The system of claim 1, wherein the audio signal includes additional sound and wherein the mixer is configured to separate the voice from the additional sound.

3. The system of claim 2, further comprising a decoder, coupled to the mixer and the encoder, comprising an inverse short-time Fourier transform module to reconstruct the input audio signal without the additional sound using the second magnitude spectrum and the phase spectrum.

4. The system of claim 1, wherein the non-causal convolution layers provide lookahead at future frames.

5. The system of claim 4, wherein the non-causal convolution layers increase latency of the system.

6. The system of claim 1, wherein the TCN comprises at least one stack of 1-D convolution blocks that repeat n times.

7. The system of claim 1, wherein the TCN is trained using a frequency SNR cost function used to calculate loss during training, and wherein the frequency SNR cost function includes a logarithmic scale to balance quiet and loud magnitudes.

8. The system of claim 1, wherein the system is executable on small form factor devices.

9. A method for dynamic noise reduction, comprising:

receiving, by an encoder, an input audio signal, the input audio signal including voice;

performing, by the encoder, a short-time Fourier transform on the audio signal to generate a first magnitude spectrum and a phase spectrum;

estimating, by a temporal convolution network (TCN), a separation mask based on the first magnitude spectrum using deep learning, wherein the TCN comprises non-causal convolution layers merged with causal convolution layers; and mixing the separation mask with the first magnitude spectrum to separate the voice from the input audio signal and obtain a second magnitude spectrum for the voice.

10. The method of claim 9, wherein the audio signal includes additional sound and wherein mixing includes separating the voice from the additional sound.

11. The method of claim 10, further comprising performing, by a decoder, an inverse short-time Fourier transform using the second magnitude spectrum and the phase spectrum to reconstruct the input audio signal without the additional sound.

12. The method of claim 9, wherein estimating the separation mask includes looking ahead at future frames.

13. The method of claim 9, wherein the TCN comprises at least one stack of 1-D dilated convolution blocks that repeat n times to estimate the separation mask using deep learning.

14. The method of claim 9, wherein the TCN is trained using a frequency SNR cost function used to calculate loss during training, and, wherein the frequency SNR cost function includes a logarithmic scale to balance quiet and loud magnitudes.

15. At least one non-transitory computer readable medium, comprising a set of instructions, which when executed by one or more computing devices, cause the one or more computing devices to:

receive, by an encoder, an input audio signal, the input audio signal including voice;

perform, by the encoder, a short-time Fourier transform on the audio signal to generate a first magnitude spectrum and a phase spectrum;

estimate, by a temporal convolution network (TCN), a separation mask based on the first magnitude spectrum using deep learning, wherein the TCN comprises non-causal convolution layers merged with causal convolution layers; and mix the separation mask with the first magnitude spectrum to generate a second magnitude spectrum for the voice.

16. The at least one non-transitory computer readable medium of claim 15, wherein the audio signal includes additional sound and wherein the set of instructions further cause the one or more computing devices to separate the voice from the additional sound.

17. The at least one non-transitory computer readable medium of claim 16, wherein the set of instructions further cause the one or more computing devices to:

perform, by a decoder, an inverse short-time Fourier transform using the second magnitude spectrum and the phase spectrum to reconstruct the input audio signal without the additional sound.

18. The at least one non-transitory computer readable medium of claim 15, wherein estimating the separation mask includes looking ahead at future frames.

19. The at least one non-transitory computer readable medium of claim 15, wherein the TCN comprises at least one stack of 1-D dilated convolution blocks that repeat n times to estimate the separation mask using deep learning.

20. The at least one non-transitory computer readable medium of claim 15, wherein the TCN is trained using a frequency SNR cost function used to calculate loss during training, and, wherein the frequency SNR cost function includes a logarithmic scale to balance quiet and loud magnitudes.

* * * * *